(12) United States Patent
Wang et al.

(10) Patent No.: US 8,811,229 B2
(45) Date of Patent: Aug. 19, 2014

(54) HANDLING ICS ENHANCED AND NON ENHANCED MSC IN A POOL

(75) Inventors: Jian Wang, Beijing (CN); Ralf Keller, Würselen (DE); Fredrik Lindholm, Stockholm (SE); Daniel Mateos Perez, Getafe (ES); Santiago Muñoz Muñoz, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 101 days.

(21) Appl. No.: 13/577,474

(22) PCT Filed: Feb. 8, 2010

(86) PCT No.: PCT/CN2010/000168
§ 371 (c)(1),
(2), (4) Date: Sep. 18, 2012

(87) PCT Pub. No.: WO2011/094900
PCT Pub. Date: Aug. 11, 2011

(65) Prior Publication Data
US 2013/0194966 A1    Aug. 1, 2013

(51) Int. Cl.
*H04L 12/28* (2006.01)
(52) U.S. Cl.
USPC .......................... 370/254; 370/331; 370/352
(58) Field of Classification Search
CPC ...... H04L 41/12; H04L 65/1016; H04L 69/08
USPC ................................................. 370/254, 352
See application file for complete search history.

(56) References Cited

U.S. PATENT DOCUMENTS

| | | | |
|---|---|---|---|
| 2007/0206580 A1* | 9/2007 | Silver et al. .................. | 370/356 |
| 2007/0243876 A1* | 10/2007 | Duan ............................ | 455/445 |
| 2009/0129372 A1* | 5/2009 | Pandey et al. ................ | 370/352 |
| 2010/0205268 A1* | 8/2010 | Zhu et al. ..................... | 709/206 |
| 2010/0296418 A1 | 11/2010 | You et al. | |
| 2011/0064073 A1* | 3/2011 | Lu et al. ....................... | 370/352 |

FOREIGN PATENT DOCUMENTS

| | | |
|---|---|---|
| CN | 101198101 A | 6/2008 |
| CN | 101325734 A | 12/2008 |
| WO | 2008074367 A1 | 6/2008 |

* cited by examiner

*Primary Examiner* — Gary Mui
(74) *Attorney, Agent, or Firm* — Coats and Bennett P.L.L.C.

(57) ABSTRACT

The invention related to handling core network entities of a radio core communications network comprising a first network entity and a second network entity. The said second network entity differs from the first network entity in that it is capable of processing interworking between messages exchanged with said radio core communications network and messages exchanged with an IP multimedia subsystem. In other words, one network entity is capable of performing inter-working while the other one not. The first and/or second network entities are provided (S200) with configuration information indicating a relationship between the two network entities. The invention then foreseen routing (S300) messages relating to calls established between the at least one user terminal attached to the entity non capable of inter-working and a further user terminal attached to said IP multimedia subsystem according to said configuration information.

18 Claims, 5 Drawing Sheets

HANDLING ICS ENHANCED AND NON ENHANCED MSC IN A POOL

TECHNICAL FIELD OF THE INVENTION

The present invention relates to communications in a network and more particularly to a method, a system, corresponding and interrelated network entities as well as to a computer program for handling network entities of a radio core communications network. The radio core communications network comprises network entities capable of inter-working between a radio core communications network and an IP multimedia system and network entities which are not capable of performing the inter-working.

BACKGROUND

ICS (IMS centralized service, see also TS 23.292) in 3GPP is aiming to study the architectural requirements and alternatives for the delivery of consistent services to the user mainly via the services centralized in IMS domain regardless of the attached access type, e.g. CS (circuit switched, CS) domain access or IP-CAN. It also considers how to support the service continuity when the user changes the access type from CS domain to IP-CAN or vice versa even when being engaged in a mid-call service, i.e. service continuity at domain transfer.

To deploy ICS for an existing CS network, the MSCs (Mobile Switching Center) need to be upgraded to have ICS functionality, i.e. to act as a User Agent (UA) for a CS user towards IMS domain, therefore to convert CS signalling to SIP towards IMS and vice versa The deployment of ICS may differ from one network to another, depends on the business plans of the network operator or depending on the current configuration of the network. Some operators may choose migrating all CS users to ICS over a long period of time, so that they may want to start with a small step in order to minimize the efforts in network integration and development. Some operators may see no need to upgrade all CS users to ICS in 5 to 10 years, so that they would like to restrict the impact on the existing CS network. In both cases, the operators would like to minimize the impact on CS network due to ICS.

The current solutions foresee that the delivery of consistent services shall be achieved by replacing the standard MSC capable of circuit switched connection services with enhanced MSC. The term enhanced MSC is used in the present context to refer to network nodes like an MSC which are capable of the above mentioned inter-working functionalities. In those situations wherein existing legacy MSCs (with legacy we will refer to MSC which are not enhanced, or which are not capable of performing interworking between a radio communication network and an IP multimedia subsystem) are present and are responsible for attaching user terminals, it is not possible to provide delivery of consistent services since such legacy non enhanced MSC are not adapted to perform registration with the IMS or handle the corresponding messages. The current solution therefore foresees a replacement of all existing MSC in an area in order to provide delivery of consistent services in the same area.

However, as seen above, one problem related to the existing solutions is that it is not possible to have an ICS deployment having a minimum impact on an already deployed existing network.

SUMMARY OF THE INVENTION

It is an object of the present invention to overcome at least some of the technical problems of the prior art. It is furthermore an object of the present invention to provide a network entity, system, method and computer program for handling messages between legacy networks and IP network architecture while minimizing the efforts needed for system integration and maximizing the reuse of existing solutions, services, applications and functionalities.

According to a first aspect the present invention provides a method for handling core network entities of a radio core communications network. The radio core communications network comprises a first network entity and a second network entity, wherein the second network entity differs from the first network entity in that it is capable of processing inter-working between messages exchanged with the radio core communications network and messages exchanged with an IP multimedia subsystem. In other words, one entity is capable of the inter-working while the other entity not. The method then comprises a further step of providing at least one amongst the first and second network entities with configuration information. The configuration information indicates a relationship between the first and second core network entities. The method comprises a further step of routing messages relating to calls established between at least one user terminal attached to the first network entity and a further user terminal attached to the IP multimedia subsystem according to the configuration information. The steps can be executed in sequence or in parallel according to circumstances.

According to a second aspect of the invention it is provided an attaching core network entity for a radio core communications network. The attaching core network entity comprises a communication entity and a storage entity. The communication entity is adapted to exchange messages relating to calls associated to at least one user terminal attached to said attaching core network entity through a radio network interface. The storage entity is for storing configuration information indicating a relationship between the attaching core network entity and one further core network entity. Furthermore, the attaching core network entity differs from the further core network entity in that the further core network entity is adapted to process inter-working between messages exchanged with the radio core communications network and messages exchanged with the IP multimedia subsystem. In other words, one entity is capable of the inter-working while the other entity not. The communication entity is further adapted to route the messages according to the configuration information.

According to a third aspect of the invention it is provided a serving core network entity for a radio core communications network. The serving core network entity comprises a processing entity, a forwarding entity and a storage entity. The processing entity is for processing inter-working between messages exchanged with the radio core communications network and messages exchanged with an IP multimedia subsystem. The forwarding entity is for forwarding messages associated to at least one user terminal attached to an attaching core network entity, wherein the serving core network entity differs from the attaching core network entity in that it comprises the processing entity. In other words, one entity is capable of the inter-working while the other entity not. The storage entity is for storing configuration information indicating a relationship between the serving core network entity and the attaching core network entity. The forwarding entity is further adapted to forward the messages according to the configuration information.

According to a fourth aspect of the invention it is provided a system for a radio core communications network, wherein the system comprises an attaching core network entity as above described and a serving core network entity as above described.

According to a fifth aspect of the invention it is provided a computer program for handling core network entities of a radio core communications network, the computer program comprising instructions configured, when executed on a programmable system, to cause the programmable system to carry out the method as for instance described above.

Further advantageous embodiments are defined in the dependent claims. Further examples are provided in the description for facilitating the understanding of the invention and explaining further details and advantages related to the invention.

DETAILED DESCRIPTION

In the following, several embodiments and examples of the present invention will be presented. As it will also be evident from the following explanation, the different embodiments can be differently combined according to the principle of the invention.

Figure 1:
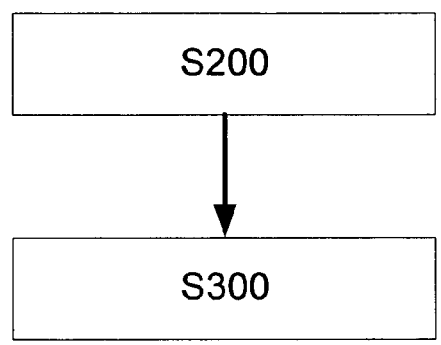
FIG. 1 is a flow chart illustrating a method according to an embodiment of the present invention.

With reference to FIG. 1, it will be described a first embodiment of the present invention relating to a method for handling core network entities of a radio core communications network. A network entity, as it will also be explained in the following in more detail, is used to refer to one or more network devices or network nodes which implement predetermined functions in a distributed (through a plurality of nodes or devices) or centralized (by means of a single node or device) manner. A radio core communications network (also sometimes referred to as CN in short) represents that part of a radio communications network comprising network entities for performing routing of calls and of signalling messages. The core network comprises all those entities of a radio communications network which do not directly interact with a user terminal over a radio interface. A radio core network does typically not comprise those devices which are directly supervising the network entities communicating with user terminals. For instance, with reference to a UMTS network, the core network of the radio network typically comprises MSC devices or MSC servers. In such example, the radio access network typically comprises base stations (or node B) and radio network controller (RNC nodes). The network entities or devices of the radio access network (also sometimes referred to as RAN in short) communicate with the devices of the core network over dedicated interfaces.

In the present invention, the term circuit switched network will be used to refer to those networks comprising network entities suitable to handle circuit switched operations or circuit switched services. Examples of circuit switched services are voice calls, data calls or short messages like SMS which are carried over the radio access and core network entities according to legacy circuit switched operations. Typical examples of such networks are including GSM, GPRS or UMTS networks. In fact, radio access network nodes (like for instance BSC in a GSM network or an RNC in a UMTS network) or core network nodes (e.g. an MSC node) of such networks are capable of handling circuit switched operation or circuit switched services. With reference to a UMTS network, reference is made to those parts of the UMTS network which rely on circuit switched technologies or on nodes handling circuit switched operations or circuit switched services among nodes of the radio access network or among nodes of the core network or between RAN and CN nodes.

Therefore, according to one example for putting the first embodiment into practice, the method may be applied to handling MSC or MSC servers of a UMTS radio core communications network. Similarly, the present invention is suitable for handling core network devices of networks like GSM, GPRS, etc. . . .

With reference to FIG. 1, the radio core communications network to which the method of FIG. 1 can be applied comprises a first network entity and a second network entity. The first and second network entities are distinguished from each other. More specifically, the second network entity differs from the first network entity in that it is capable of processing interworking between messages exchanged with the radio core communications network and messages exchanged with an IP multimedia subsystem. In other words, the network entity is capable of processing messages—including calls and user network signalling—received over a circuit switched access network and of interworking with messages of an IP multimedia subsystem and vice versa. In one example, the messages received over the circuit switched access can be messages exchanged over an A/Iu or/and E interface while messages exchanged with the IP multimedia subsystem could be SIP messages. In the present invention we will refer to network entities like the second network entity above described as network entities enhanced for IMS centralized services (ICS) or in short as enhanced network entities. Network entities like the first network entity above described will also be referred as network entities non-enhanced for ICS (or, in short, non-enhanced network entity), since such network entities are not capable of performing the above mentioned interworking. In one example, the second network entity may be an MSC network node enhanced for ICS or an MSC server enhanced for ICS. The first network entity may be according to one example a legacy MSC capable of performing only circuit switched operations and not capable of performing the above mentioned interworking. Similarly, the first network entity may be an MSC server capable of handling only legacy circuit switched operations and not the above mentioned interworking.

The first network entity is further a network entity capable of attaching user terminals accessing a radio communications network over a radio network interface (attaching refers to a user equipment performing the necessary operations and steps for establishing connections in order to access services from a network). In order to perform the attachment, network devices of the RAN may interact as known in the art. For instance, with reference to a UMTS network, the first network entity may be an MSC capable of handling circuit switched communications and capable of direct communications which an RNC node of an UMTS radio access network. With reference to another example applicable to a GSM network, the first network entity may be an MSC capable of performing circuit switched communications and of exchanging messages with a BTS controller belonging to a GSM radio access network. As also mentioned above, the referred messages can be exchanged through interfaces like the A/Iu and/or E interface. Those messages can be user network messages.

In other words, the method according to the present invention is for handling core network entities comprising at least two network entities, wherein one of them is capable of interworking messages between a radio core communications network (like a legacy circuit switched radio core communications network) and an IP multimedia subsystem. The other core network entity is instead not capable of performing this interworking.

The method then foresees a step S200 for providing at least one of the first and second network entities with configuration information, wherein the configuration information indicates a relationship between the first and second core network entities. This implies that the configuration information may be sent to the first network entity (e.g. non ICS capable MSC) or to the second network entity (e.g. the ICS capable MSC). In another example the configuration information may be sent to both the first and second network entities. As it will also be explained in the following, according to one modification of the embodiment, the configuration information may be sent to the first network entity (i.e. the network entity not capable of said interworking) for handling user equipment originating calls. According to another example, the configuration information may be sent to the second network entity capable of performing said interworking for handling user equipment terminating calls. Thus, in case the configuration information is sent only to the first network entity, this may be used for routing messages relating to calls from the user equipment to the IMS; in this example, calls originating in the IMS may not be routed to the user equipment accessing a radio access network over the first network entity not capable of performing the interworking. In the example wherein only the second network entity is provided with configuration information, it may be possible to perform only routing of calls originating from the IMS and terminating to the user equipment accessing the network over the first network entity (i.e. being attached or being registered in the network through the first network entity) while calls originating from the user equipment may only be routed according to legacies circuit switched operations. In case the configuration information is instead provided to both the first and second network entities, then both UE originating and UE terminating calls may be provided, respectively, to/from the IMS with delivery of consistent services via the services centralized in the IMS domain. Further examples will be provided later in the specification showing how the configuration information can be provided to one or both the first and second network entities.

The method then comprises a step S300 of routing messages relating to calls established between the user terminal above mentioned (that is, the user terminal attached to the first network entity) and a further user terminal attached to the IP multimedia subsystem according to the configuration information. It is noted that user terminals, user equipments or mobile terminals are herein interchangeably used terms to refer to user devices capable of connecting to a network. Examples of such devices are mobile telephones, laptops, PDAs etc. . . . The message above described may relate to the above mentioned user terminal accessing the network through legacy circuit switched network entities; however, those messages may also refer to a plurality of user terminals accessing the legacy circuit switched network devices and a plurality of user terminals attached to the IMS. The term calls is herein used to refer to any type of connection suitable for carrying user data. In general a call refers to an exchange of data between a user terminal and another device. Therefore, a call may comprise a voice call, a video call, a data call, etc. . . . The call is routed to/from the first network entity, being for instance a non enhanced MSC or a legacy circuit switched MSC, which in turn routes the call further. The above described further user terminal attached to the IP multimedia subsystem is a user terminal that may be able to access a communications network and access a given set of services in a centralized and consistent manner regardless of the type of access used, that is to say regardless of whether the access occurs through a CS domain or through an IP-CAN. This is made possible by the IP multimedia subsystem to which such a further user terminal may attach to, i.e. to which the further user terminal may register when accessing the network.

The configuration information according to the present method therefore allow establishing a relationship or an association between the first network entity and the second network entity, i.e. it allows the establishment on an association between a network entity which is capable of interworking between circuit switched operations and services and IMS operations and services (the second core network entity) and a network entity (like the first core network entity) which is not capable of performing said interworking functions. On the basis of such information, the routing of calls or exchange of messages relating to such calls may be performed. Therefore, even when accessing a network over a legacy circuit switched network—normally not capable of handling IMS operations or services—a user terminal is capable of using the full capabilities offered by the IMS since the configuration information will instruct the first non enhanced network entity to handle messages through the second enhanced network entity. Therefore, thanks to the present invention, it is possible to allow users accessing a network from legacy circuit switched entities to access IMS centralized services without the need to substitute or upgrade all core network entities. Consequently, an increased functionality can be achieved by means of a solution simple to realize, resulting in a limited impact on and reduced modification of the existing deployed networks.

According to an optional modification of the first embodiment, the configuration information may comprise first identification information identifying at least the second network entity. In such case, the information identifying the second network entity may be communicated only to the first network entity which will then be able to establish a relationship with the enhanced radio core network entity. It shall be noticed that the configuration information may establish the relationship between the first and second network entities by communicating explicit information corresponding to the two network entities (or, as it will be seen in the following, to more network entities) that are to be put in relationship. According to another example, the configuration information may indicate to a network entity only the identification information of another network entity (or of other network entities) which will be put in relationship or association with the network entity that receives the configuration information. According to the optional modification above introduced, the step of routing messages may be performed at the first core network entity and may comprise the step of routing messages originating from the mentioned one user terminal (that is, the user terminal accessing the network through a legacy circuit switched core radio network entity) through the second core network entity according to the first identification information. In other words, according to the present modification of the embodiment, it is possible to communicate to the first network entity information corresponding to the second network entity, such that the first network entity will be able to route calls originating from the user terminal accessing the legacy circuit switched network through the second network entity, such that this user terminal will be able to access services in a centralized way from the IMS thanks to the interworking provided by the second core network entity.

It is worth noting that the configuration information according to the present invention establishes a relationship or an association between two core network entities of a radio core communications network. This implies that the invention can achieve the mentioned advantages, namely allowing a user accessing a legacy circuit switched network to access centralized IMS services, by applying minor modifications on existing parts of a core radio network. In fact, it is not needed to incorporate further interworking nodes or gateways between a legacy network and another network. A solution based on a gateway would in fact require further adaptation and technical implementations resulting in a system more difficult to integrate and to upgrade, therefore also more difficult to maintain. By applying minimal modifications to existing nodes, the present invention achieves a solution easier to deploy and more suitable for future migrations.

The method according to the present embodiment may further and optionally foresee that the first identification information is for identifying at least a further network entity capable of performing the interworking above mentioned. In other words, according to this situation, the identification information may establish a relationship or association between the first network entity and two or more network entities one of which is the second network entity above mentioned. In case the two or more further network entities are all capable of the interworking above mentioned, the first network entity may refer to one among them according to situations. As it will also be explained in more detail in the following, in fact, the first network entity may route calls or handle corresponding messages to one of the associated enhanced network entities according for instance to load balancing criteria or depending on availability of those further network devices. For instance, a first network entity may normally refer to the second network entity; however, in case of failure of the second network entity, the first network entity may refer to a further network entity representing a backup for the second network entity. The configuration information associated in the first network entity to two or more further core network entities may be static or dynamic, implying that the information can be set once for a given period of time (e.g. until a new configuration is specifically established) or dynamically. A dynamic setting implies that the information can change over time by being adapted or updated according to circumstances.

The method according to the first embodiment may optionally foresee that the configuration information comprises second identification information identifying at least the mentioned first network entity, i.e. the non enhanced first core network entity.

According to such example, the second identification information may be sent to the second network entity and may comprise information identifying only a first network entity (or, according to another example, a plurality of non-enhanced core network entities). In such a case, the second configuration information implicitly establishes a connection between the second network entity (receiving or storing the second configuration information) and the identification information relating to the first non enhanced core network entity. According to the present example, the step of routing messages may be performed at the second core network entity and may comprise the step of routing messages terminating on the at least one user terminal attached to the first network entity according to the second identifying information. In other words, according to this example, the second network entity may perform routing calls or corresponding messages destined to the user terminal accessing the network over the legacy circuit switched network. This is achieved by using the second identifying information indicating to the enhanced (core) network entity the non enhanced core network entity to which the user terminal is currently attached. Therefore, the user terminal accessing a network over a legacy circuit switched network may be reached for termination of calls relating to services centralized according to the IMS.

The method according to this embodiment may further and optionally foresee that the relationship between the first and second core network entities may comprise indicating that the second core network entity is a serving network entity for the first network entity. In other words, the configuration information may specify that the second network entity is the serving network entity for allowing the first network entity to access and perform interworking operations with the IMS. For instance, thanks to this association, the first network entity would be able to rely on the second network entity for performing location updates relating to a user terminal attached through a legacy circuit switched network. The second network entity would be the serving network entity for such operations (like location update) or services.

The method according to the first embodiment may further and optionally foresee that the relationship between the first and second core network entities may comprise indicating that the second core network entity is not a serving network entity for the first network entity. In other words, the configuration information may explicitly indicate that first and second network entities are not in a given relationship or that a previously provided relationship among those first and second network entities is not anymore valid. Such situation may occur when performing a deregistration of a user terminal (e.g. when a user terminal is switching off or is not anymore reachable) or when making a location update in a different are such that the previously associated second core network entity is not anymore to be put in relationship or association with the first network entity. Such situation may also occur when the user terminal is not attached to the first network entity but to another non enhanced core network entity, such that the previous association or relationship needs to be explicitly cancelled by explicitly communicating that a given relationship between those two devices is not present. Such indication that the second network entity is not a serving network entity for the first network entity (e.g. deregistration of a user terminal) may be implemented by adding a new or modifying an existing MAP message. A detailed example will be provided in the following.

The method according to the first embodiment may further and optionally foresee that the configuration information is updated when the user terminal detaches from the first core network entity and attaches to another core network entity.

The step of updating comprises the deletion of previous configuration information and/or replacement of the same configuration information with new one relating to the new attaching entity. Also here the implementation can be made by adding a new or modifying an existing MAP message. Therefore, the configuration information are updated in order to reflect an association between the network entities which are involved in providing services to a given user terminal. Such situation is typical of the case wherein a user terminal moves to an area such that either one or both of the first and second core network entities change to a new network entity not capable of performing the corresponding functions; for instance, when the attaching network entity is not capable of attaching the user terminal or maintaining the association according to the invention; or when no enhanced network entities are provided in correspondence of a given area. For instance, when a mobile terminal moves from a first non enhanced core network entity to a further non enhanced core network entity, the method according to the present invention may foresee that the configuration information are updated in order to inform the second network entity with configuration information indicating that the previously valid relationship between the first non enhanced core network entity and second enhanced core network entity is not anymore valid. At the same time of thereafter, new configuration information may be provided as being valid, which associates the further or new non enhanced core network entity (through which the user terminal is accessing the legacy circuit switched access network) with the second enhanced core network entity. According to a further example, when the user terminal moves to a new non enhanced core network entity served by a different enhanced network entity different from the initial second network entity, then the configuration information may also indicate a new relationship among the new non enhanced core network entity and the new enhanced core network entity involved in processing the calls or messages originating from or destined to the user terminal.

When moving away from a first non-enhanced core network entity, the user terminal may move to a new (attaching) core network entity which is an enhanced core network entity. In such case, therefore, the association with the second network entity may not be necessary anymore. Therefore, the configuration information may comprise void fields or may indicate that the previously valid configuration information shall be deleted without providing any replacement for the same. In fact, the user terminal can now be served directly by the attaching enhanced core network entity such that the configuration information can be deleted or ignored.

The method according to the present embodiment may further and optionally foresee that the second network entity may register at least one user terminal with the IP multimedia subsystem. The registration may be performed on the basis of the configuration information. An example of such operation will also be described with reference to the serving core network entity described in FIG. 3 or with reference to the flow chart of FIG. 6. Accordingly, even when a user terminal is accessing a legacy circuit switched access network and is attached to a legacy circuit switched (e.g. non enhanced) MSC, a registration with the IMS is still possible through the enhanced core network entity thanks to the configuration information establishing a relationship between the non enhanced and the enhanced core network entities. Consequently, a user terminal will be able to access all the IMS services in a centralized way also when accessing a network from a legacy circuit switched access network served by a non enhanced call network entity like a non enhanced MSC.

In the following, further embodiments as well as examples illustrating how the invention can be implemented will be provided. The same considerations made above with reference to the first embodiment will apply also to the following, such that the observations made above apply here. Reference is consequently made to the above parts equivalently applying to the following disclosure, which will then focus only on the main aspects necessary for clarifying each of the embodiments or examples provided.

Figure 2:
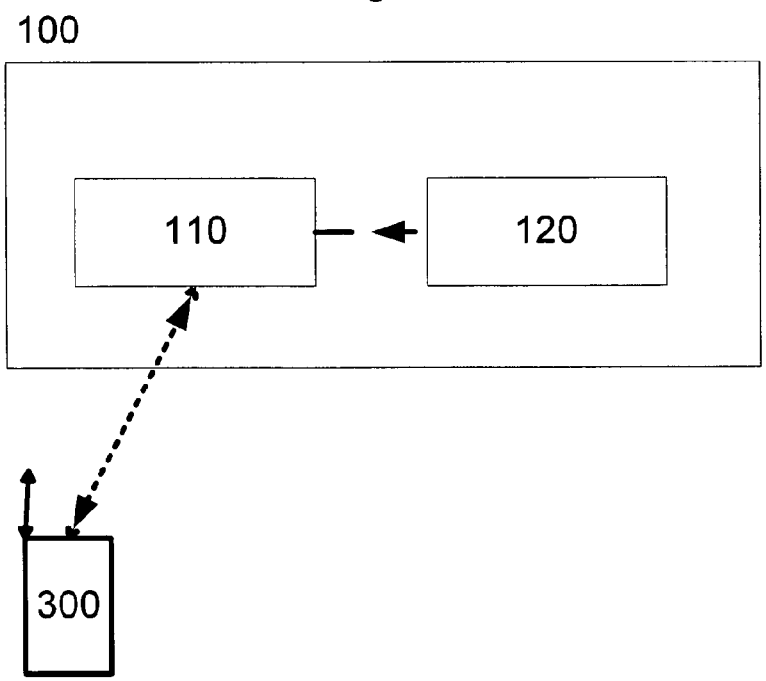
FIG. 2 is a schematic block diagram illustrating a network entity according to an embodiment of the present invention.

A second embodiment providing an attaching core network entity 100 will now be described with reference to FIG. 2. FIG. 2 is a schematic block diagram comprising an attaching core network entity 100 including a communication entity 110 and a storage entity 120. The attaching core network entity is an entity comprised in a radio core communications network as also explained above. The attaching core network entity 100 may be in one example the first network entity referred to in the method of the first embodiment. FIG. 2 also shows a user terminal 300 capable of accessing IMS services but which is however accessing a communications network over legacy circuit switched radio access network (e.g. through nodes not capable of performing the necessary interworking).

The communication entity 110 is an entity adapted to exchange messages relating to calls associated to at least one user terminal attached to the attaching core network entity 100 through a radio network interface. The user terminal may be attached to the network entity 100 through the communication entity 110 or through a dedicated attaching entity not depicted in the figure. The radio network interface through which the user terminal establishes communication with the radio communications network may comprise a communication interface suitable for performing communication between the user terminal and one base station or an interface that allows communication between two nodes of the radio communications network. According to one example, the radio network interface may be a Iu interface in a UMTS radio access network or an A interface in a GSM network. In other words, the communication entity 110 is an entity that provides legacy interfaces typical of circuit switched radio networks and which are therefore not capable of ICS, i.e. are not capable of providing any centralized IMS services.

Figure 5:
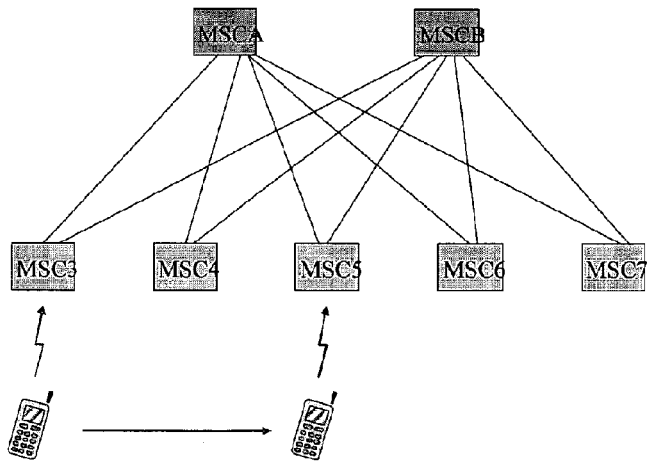
FIG. 5 is a schematic block diagram illustrating a scenario to which the present invention can be applied.

The storage entity 120 is an entity adapted to store configuration information indicating a relationship with the attaching core network entity not depicted in FIG. 2. For the configuration information, the same considerations apply as made above with reference to the method of the first embodiment. Therefore, the storage entity 120 stores the relationship between the non enhanced (i.e. non ICS capable) network entity 100 and another core network entity which is an enhanced core network entity. The further core network entity referred to above, may be the second network entity discussed in the above method or as also detailed below in corresponding examples. It is worth underlining that the attaching core network entity 100 of the present embodiment differs from the mentioned further core network entity in that the further core network entity is adapted to process interworking between messages exchanged with the radio core communications network and messages exchanged with the IP multimedia subsystem. In other words, the storage entity 120 stores information expressing a relationship among one attaching entity which is not ICS capable and another network entity which is instead ICS capable. As it will be seen in the following, MSC3 is an example of an attaching core network entity 100 according to the present embodiment while MSCA is an example of the further core network entity which is ICS capable, as illustrated in FIG. 5 and described in corresponding passages below.

The communication entity 110 is further adapted to route the messages above mentioned according to the configuration information. In other words, the communication entity of the attaching core network entity 100 routes messages relating to calls to/from the further network entity thus allowing a user terminal attached to the non enhanced core network entity (i.e. through a legacy circuit switched RAN and legacy circuit switched core network entity) so that this user terminal may access in a centralized way all services as provided through an IMS.

Therefore, thanks to the present invention and more particularly to the configuration information, a user terminal may be able to access IMS centralized services in a consistent way even through a non enhanced core network entity without the need to perform substantial modifications or adaptation to the existing core network. Configuring the legacy non enhanced core network entity in order to handle the configuration information is in fact much simpler to implement and maintain than redeveloping the same entity or device in order to provide interworking functionalities. Consequently, IMS centralized services are accessible to a user terminal accessing a network through legacy devices, while maintaining the network development or integration at a minimum.

The configuration information mentioned above with reference to the attaching core network entity 100 may optionally comprise first identification information identifying at least the further network entity above mentioned, wherein it is recalled that the further network entity may be a network entity which is ICS capable. In this case, the communication entity 110 may be further adapted to route messages originating from the mentioned at least one user terminal (attached to the non enhanced core radio network entity) to the further core network entity according to the first identification information. In other words, according to this example, the configuration information may simply identify the further enhanced core network entity such that a relationship is implicitly inferred by the attaching core network entity 100— the relationship being between the attaching core network entity 100 and the further core network entity. Accordingly, messages relating to calls are handled according to the described association or relationship.

The first identification information above mentioned may further and optionally comprise information for identifying at least another network entity capable of performing the above mentioned interworking. In other words, according to this example, the first identification information may establish a relationship between the attaching core network entity 100 and two or more radio core network entities capable of performing interworking (i.e. with two or more enhanced radio core network entities). Therefore, the routing of the mentioned messages can be performed to one or another enhanced core network entities depending for instance on load balance, occurrence of failures of one of the two entities or on other considerations according to circumstances. In the following, further examples will be provided explaining further advantages of the present invention.

Figure 3:
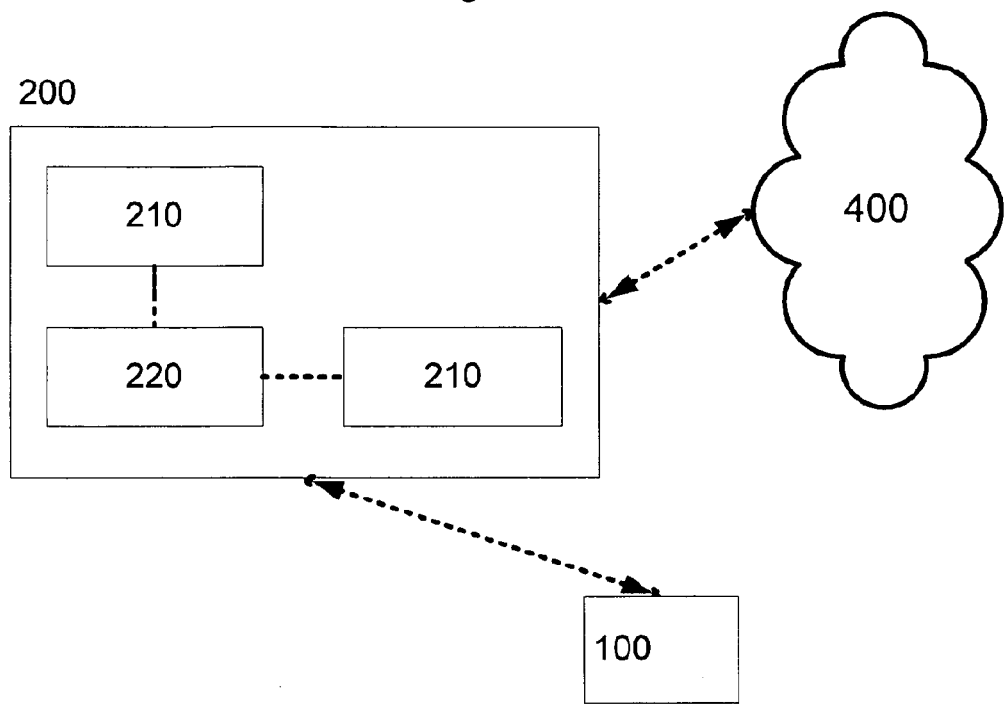
FIG. 3 illustrates a schematic block diagram representing a network entity according to a further embodiment of the present invention.

A third embodiment of a serving core network entity will now be described with reference to FIG. 3. FIG. 3 depicts a serving core network entity 200 according to the third embodiment. It can be seen that the entity 200 is capable of establishing communication with an IP multimedia subsystem 400 and with a core network entity 100. The core network entity 100 may be the attaching core network entity 100 described in the second embodiment and depicted in FIG. 2. The entity 100 depicted in FIG. 3 may also be represented by the first network entity described with reference to the method of the first embodiment. The serving core network entity 200 is a network entity for a radio core communications network and comprises a processing entity 210, a forwarding entity 220 and a storage entity 230.

The processing entity 210 is an entity for processing interworking between messages exchanged with the radio core communications network (e.g. with the device 100 and/or with further devices not depicted in FIG. 3) and messages exchanged with an IP multimedia subsystem 400. Thanks to the functionalities of the processing entity 210, the serving core network entity 200 is an enhanced radio core network entity as described above or in the following.

The forwarding entity 220 is an entity adapted to forward messages associated to at least one user terminal attached to an attaching core network entity (of which a network entity 100 represent an example). The serving core network entity 200 and the attaching core network entity are distinguished from each other in that the serving core network entity differs from the attaching core network entity in that it comprises the processing entity. In other words, the serving core network entity and the attaching core network entity are different in that the first is an enhanced core network entity while the other is a non enhanced core network entity. The storage entity 230 stores the configuration information, e.g. an association between an enhanced and a non enhanced core network entities.

The forwarding entity 220 is then adapted to forward the mentioned messages according to the configuration information. Consequently, the serving core network entity 200 is capable of ensuring delivery of consistent services via the services centralized in an IMS domain also to users being attached to a non enhanced core network entity on the basis of the configuration information. Consequently, the present invention is capable of extending the delivery of consistent services via an IMS domain to several user terminals without the need to upgrade and modify all the core radio network entities of a given network. To the contrary, the invention requires that only a limited number of entities are to be upgraded to enhanced network entities which are capable of providing the necessary services on the basis of the configuration information. Therefore, the solution proposed by the present invention requires less impact on the existing networks through a simple to implement solution.

The messages forwarded by the forwarding entity 220 may comprise, according to one example, messages relating to calls associated to the at least one user terminal mentioned above. In other words, the messages represent calls which are routed according to the configuration information. According to this example, therefore, the serving core network entity 200 is capable of forwarding messages relating to calls on the basis of the configuration information expressing an association between an enhanced and a non enhanced radio core network entity.

According to another example, the messages forwarded by the forwarding entity 220 comprise at least a registration message for registering the at least one user terminal with the IP multimedia subsystem on the basis of the configuration information. An example of implementing this modification of the third embodiment will be provided in the following with reference for instance to FIG. 6. In other words, when a message forwarded by the forwarding entity 220 comprises a registration message, the serving core network entity is capable of performing a registration with the IMS of a user terminal accessing a network over a legacy circuit switched network and when the user terminal is attached to a non enhanced core network entity. That is to say, the user terminal is capable of registering with the IMS and therefore using the corresponding services thanks to the special arrangement based on the configuration information without the need to attach to an enhanced core network entity as instead required in the current state of the art. Therefore, in order to allow user terminals to access IMS services, it is not necessary to modify all core network entities in order to perform interworking. To the contrary, only minor adaptations or upgrades are needed in the network according to the present invention.

The configuration information may optionally comprise identification information identifying at least one attaching network entity, wherein the attaching network entity may be the entity 100 described with reference to the second embodiment or the first network entity described with reference to the first embodiment. In such case, the forwarding entity is further and optionally adapted to route messages terminating on the at least one user terminal (i.e. the user terminal accessing a communications network from a legacy circuit switched RAN and being attached to a legacy circuit switched core network entity) according to the above mentioned identifying information. This implies that messages are forwarded to the non ICS capable core network entity specified in the identification information comprised in the configuration information.

Therefore, the serving core network entity according to the third embodiment is capable of registering user terminals with an IMS network or handling calls relating to corresponding services for user terminals which are attached to non enhanced core network entities thanks to the configuration information. This leads to the advantage that user terminals can access IMS centralized services without the need to deploy interworking functions on all core network entities but only on a limited number of them. This results in an easy to implement solution.

A fourth embodiment of a system for a radio core communications network will now be described with reference to FIG. 4. The system comprises at least an attaching core network entity and at least a serving core network entity. The attaching network entity 100 of the second embodiment may be an example of a serving core network entity 4200 of FIG. 4. Moreover, the first and second network entities described with reference to the first embodiment may represent examples of, respectively, the attaching core network entity 4100 and serving core network entity 4200 depicted in FIG. 4. Therefore, similar considerations made above apply to the network entities of the system of FIG. 4. Thanks to the configuration information, the attaching core network entity 4100 is capable of exchanging messages with the serving core network entity 4200 such that a user terminal attached to the non enhanced core network entity is capable of registering and exchanging messages with the IMS through the enhanced core network entity 4200 to which the network entity 4100 is associated through the configuration information. The same applies for the serving core network entity 4200, which is capable of performing actual registration or routing calls terminated at the mentioned user terminal by referring to the serving core network entity on the basis of the configuration information.

Figure 4:
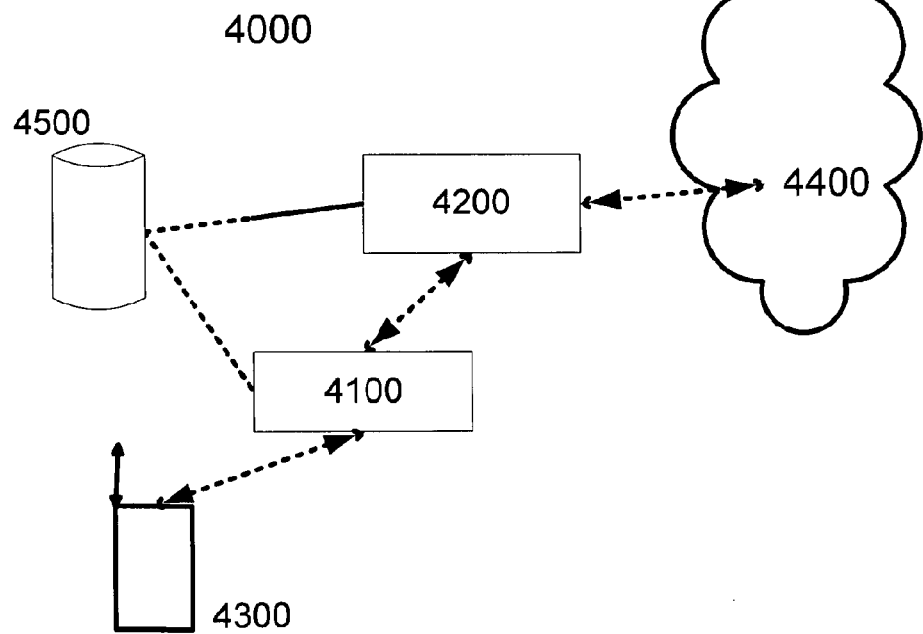
FIG. 4 illustrates a schematic block diagram of a system according to an embodiment of the present invention.

The system of FIG. 4 may optionally comprise a database 4500 for storing the configuration information and for forwarding the configuration to at least one among the attaching core network entity and the serving core network entity. The database 4500 may be comprised in a further network entity capable of determining the configuration information which are then stored in the database. The determination of the configuration information can be done in a static way (e.g. once for all or for a given period of time until a new configuration or maintenance occurs) or on a dynamic way such that they are changed and adapted according to circumstances or network conditions. As also explained in the following, an HLR is an example of implementing the database 4500 according to the present invention.

According to another embodiment, the present invention also foresees a computer program for handling core network entities of a radio core communications network wherein the computer program comprises instructions which are configured, when executed on a programmable system, to cause the programmable system to execute or carry out the steps of the method according to the first embodiment above described. In fact, as also apparent to the reader, the present invention may be realized through a computer program specifically adapted to execute the method according to the present invention. The computer system for executing the computer program comprises typical entities necessary for executing instructions like a processing entity or unit, memory (volatile or non volatile, like RAM, ROM, hard disks, etc. . . . ) and input and/or output devices as necessary.

As also evident to the skilled person, the present invention can in fact be implemented by hardware, software or any combinations thereof as more suitable according to circumstances. Moreover, the invention or parts thereof may be implemented in a distributed or centralized manner according to circumstances.

In the following, examples will be provided showing how the invention or its different embodiments can be put into practice. Moreover, examples will be provided showing how different procedures can be executed according to the principle of the present invention.

FIG. 5 illustrates a situation representing one way of minimizing the impact on circuit switched network when wanting to provide IMS centralized service also through a legacy circuit switched network. The MSCs of FIG. 5 are examples of the network entities of a radio core network according to the invention. The configuration represented in FIG. 5 foresees keeping the existing MSC nodes almost untouched and just upgrading or adding a few ICS enhanced MSC nodes in the network in order to handle all the ICS related traffic in the network.

As already mentioned in the opening part of the present specification, current solutions do not fulfill the requirements for operating such a network solution. For this reason, current prior art solutions foresee the upgrade and replacement of all legacy MSCs with upgraded or enhanced MSCs thus implying a major impact on the deployment of networks. As shown in FIG. 5, supposing that MSCA and MSCB are ICS capable, the finding of the invention is based on making MSCA and MSCB working as the ICS agents for all the other MSCs (which are non enhanced MSC) such that the traffic to/from the other MSCs will go through MSC A/B which will act as ICS user agent for the subscribers. However, according to the current known solutions, when the user equipment switches on, it will make a location update such that the HLR will get the user equipments location pointing to MSC3. When the user equipment moves to MSC5, the HLR will then have its new location pointing to MSC5. Consequently, since the nodes MSC3 and MSC5 are non ICS capable, the user will not be able to register with the IMS network and will not be able to use services in a centralized manner over the IMS. Instead, according to the present invention, the nodes MSC A/B work as ICS gateway for the other MSCs towards the IMS. As above described, the present invention achieves this by introducing the use of configuration information that will help the cooperation of enhanced and non enhanced MSCs.

It is noted that the MSCA and MSCB are examples of the serving network entities described in the third embodiment or of the second network entity described in the first embodiment. Similarly, the nodes MSC3 or MSC5 are examples of the first network entity according to the first embodiment or the attaching core network entities of the second embodiment.

The configuration information, with reference still to FIG. 5, may be implemented according to this example, in that the MSC A and/or MSC B will have the function which indicates to the HLR that the HLR should point to MSC A or/and MSC B for the user equipment for ICS, until the user equipment is moved out of the control of MSC A/B.

In one example, the described solution may be optionally applicable to home network scenarios only. In case the subscriber is roaming to a visited network, according to this example, the VMSC will receive a roaming profile which may be different from the home profile. The roaming profile might instruct the VMSC to use normal origination procedure and not to route originating calls to the home IMS.

Returning to FIG. 5, MSCA and MSCB are ICS capable, and MSC3 to MSC7 are not ICS capable. By configuration, MSCA and MSCB can know which MSCs are to be served for ICS. In this case, it's MSC3 to 7. Also by configuration MSC3 to 7 will route all outgoing calls to MSCA or MSCB. In the HLR, MSCA and MSCB are "associated" with MSC3 to 7 for ICS by configuration.

When the UE is attached to the CS network (MSC3, see step 1 in FIG. 5), HLR will have its location (following the location update of step 2), and knows that MSCA and MSCB are associated to MSC3 (step 3). The HLR will then send information to MSCA or MSCB, telling that the DE is up (step 5). For each served MSC (i.e. MSC3 to 7), there will be one primary serving MSC associated (such as MSCA) and one secondary serving MSC associated (such as MSCB). In the normal case HLR will send the information to the primary serving MSC. If the primary one is failed, it will then send the information to the secondary MSC. This may be for redundancy reason (it is noted that the two MSC A/B are optional, since the invention functions also with only one enhanced MSC). The information sent by HLR can be a new message or some new information elements (e.g. ICS flag) in an existing message (according to one example this may be the Insert Subscriber Data message, ISD, indicating the IMSI of the UE and the MSC3 node address), sent from HLR to MSCA/B. This message needs to include the IMSI such that the selected serving MSC can derive the needed IMS user identity (see 3GPP 23.292). Whereby the MSCA/B will know that the UE is up and its serving MSC is MSC3. MSCA/B will then send IMS registration to IMS domain on behalf of the UE.

Figure 6:
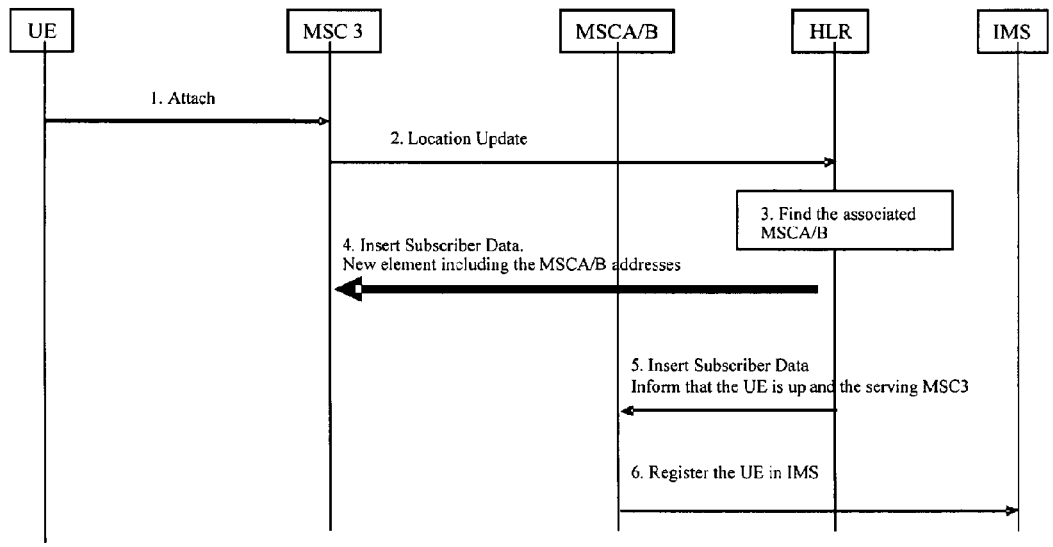
FIG. 6 illustrates a flow chart representing an attach procedure according to an embodiment of the present invention.

With continuous reference to FIG. 6, the steps therein depicted will now be illustrated in more detail. The attaching procedure foresees the step 2 of performing a location update wherein the MSC 3 to which the user equipment is now attached informs the HLR of the current position of the user equipment, e.g. that the MSC 3 is the core network node to which the user equipment is currently attached. In step 3, the HLR will find the node which is associated to the MSC 3. In the present case, such node is represented by one or both of the nodes MSC A/B as depicted also in FIG. 5. Once the associated MSC A/B is found, the HLR will provide the MSC 3 with further information as depicted in step 4. This further information comprise (optionally) subscriber data and a new information element including for instance the MSC A/B addresses (or address of only one of them). The information provided in step 4 of FIG. 6 are an example of the configuration information above described since they provide the MSC A/B address (representing an example of the identifying information of the network entities) to the MSC 3 which is now able to establish a relationship between itself and an enhanced core network node. Subsequently, with reference to step 5 of FIG. 6, the HLR informs the MSC A/B (either one or both of the nodes MSC A and MSC B depicted in FIG. 5) that the user equipment is up and that the corresponding serving node is the node MSC 3. The HLR may at the step 5 optionally also further communicate the subscriber data of the user equipment in order to inform the MSC A/B.

Following this, the MSC A/B (one of the two nodes according to an example) is then capable of registering the user equipment in the IMS on the basis of the information received in step 5.

Consequently, the user equipment is capable of being registered with the IMS even if it is attached to a non enhanced core network node.

Figure 7:
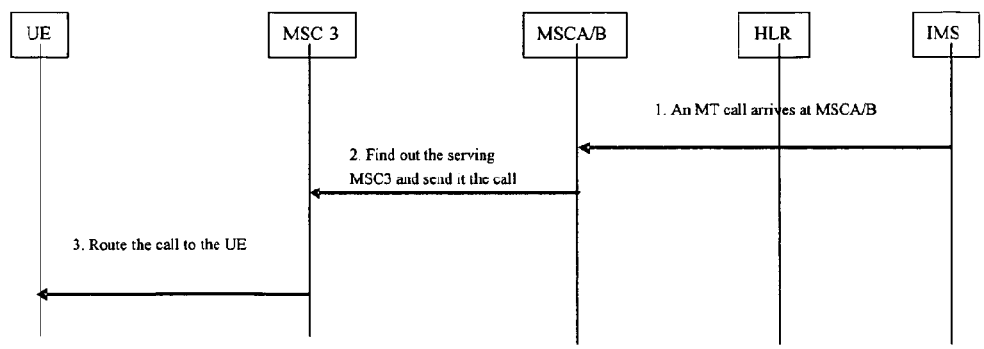
FIG. 7 illustrates a flow chart representing a mobile originating call flow according to an embodiment of the present invention.

Reference will now be made to FIG. 7, representing a flow of messages occurring in correspondence of a mobile originated call following for instance the attach procedure above described. In step 1, the user equipment places a call indicated as mobile originated MO call. In step 2, the decision to route the call to MSCA or B is based on configuration, that is, the primary route from MSC3 will point to the primary serving MSC of MSC3, and the secondary route point to the secondary serving MSC of MSC3, both as configured in the HLR. According to an example, only when the primary serving MSC fails, the secondary route will be used (again, the invention is applicable also to the case wherein only MSCA or MSCB is present). The configuration and rule of usage in MSC3 (corresponding to the configuration information above described) has been received from the HLR and it will make sure that the call will be routed to the correct serving MSC which actually made the registration in IMS for the UE.

For different MSCs (from MSC3 to 7), the primary and secondary serving MSCs can be different so that load balance between MSCA and MSCB can be reached. This load balance should either be statically configured or, alternatively, it can be easily reached by using, for example, a round robin algorithm in HLR to select the primary and the secondary ICS capable MSC upon reception of a Location Update from a non-ICS capable MSC. The usage of two enhanced MSC provides further advantages like enhanced availability. At step 3, the call party is checked and the call is routed towards the call party in order to complete the operation.

Figure 8:
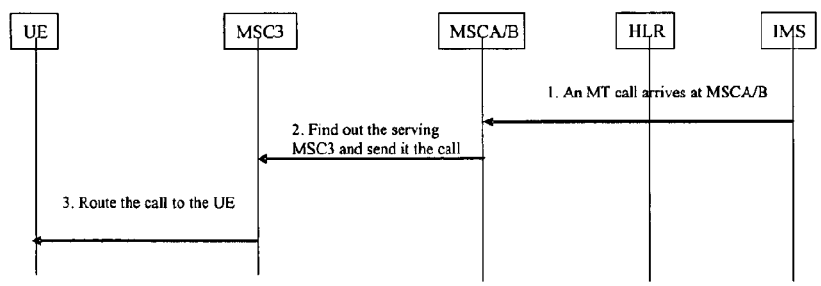
FIG. 8 illustrates a flow chart representing a mobile terminating call flow according to an embodiment of the present invention.

Reference will now be made to FIG. 8, representing the call flow in a case of a mobile terminating call. In step 1, a mobile terminated call arrives at one of or both of the enhanced nodes MSC A/B from the IMS. In step 2, it is found out which is the serving node (in the present example MSC 3) and the call is correspondingly sent to such node. The process of finding out the serving MSC 3 is performed for instance on the basis of the configuration information providing an association between the enhanced node MSC A or/and MSC B and the non enhanced node MSC 3 to which the user equipment is currently attached. It is noted that the configuration information may optionally comprise also the information identifying the user equipment such that the core network entities are capable of associating the current information to the correct user equipment.

Figure 9:
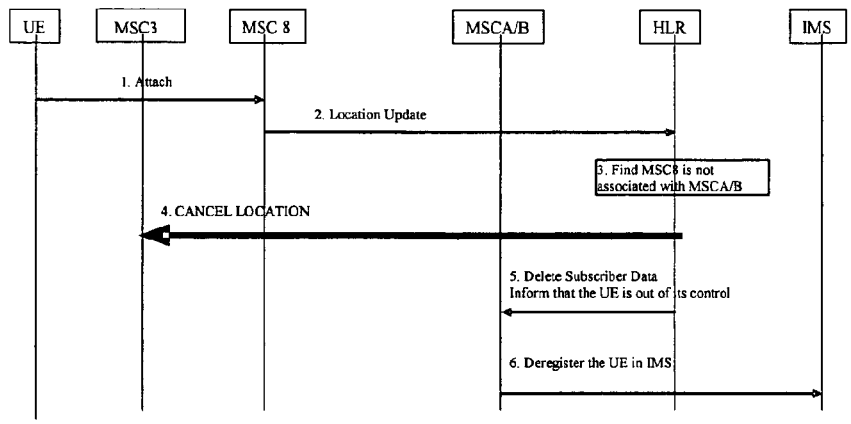
FIG. 9 illustrates a flow chart representing a user equipment UE moving out of the control of an enhanced MSC according to an embodiment of the present invention.

If the user equipment moves to a different MSC, as for instance the MSC 8 as depicted in FIG. 8 which is not served by MSC A/B enhanced for ICS, then the HLR will inform the MSC A/B (either one or both of the nodes MSC A and MSC B according to the implementation) about this condition. According to an example, a delete subscriber data MAP operation (VSD) indicating the IMSI of the user equipment and a flag of the known ISC capable MSC withdrawal is sent. Accordingly, the MSC A/B deregisters the user equipment in the IMS. The situation is represented in FIG. 9, illustrating the flow of messages for the case of a user equipment moving out of the control of an enhanced node like the node MSC A or MSC B. More in detail, in step 1 of FIG. 9 the user equipment attaches to the non enhanced node MSC 8. This operation can be performed after the user equipment switches on or upon moving of the user equipment from a previous node to which the user equipment was attached to another area served by the MSC A. Upon attaching the user equipment, the MSC 8 performs a location update with the HLR as indicated in step 2. The HLR, see step 3 of FIG. 9, following the location update finds out that the MSC 8 is not associated with the MSC A or with the MSC B. In other words, the HLR finds out that the MSC 8 is not associated with an enhanced network entity capable of performing interworking with the IMS. Therefore, the HLR performs a cancel location with the MSC 3 as indicated in step 4; this means that non enhanced MSC 3 is informed to cancel the location relating to the user equipment UE. In step 5, the HLR sends information to one or both of the nodes MSC A and MSC B informing it/them to delete subscriber data relating to the user equipment that moves to the area served by MSC 8, as indicated in step 5 of FIG. 9. In the same step 5, the MSC A/B is informed that the user equipment UE is out of its/their control. A step 6, the MSC A/B deregisters the user equipment UE in the IMS. The steps 4 and 5 of FIG. 9 are examples of the steps described in the first embodiment wherein the network entities are informed that they are not anymore associated.

It is noted that terminating calls will be routed from the IMS to the MSC A or B, which in turn will route it to the serving MSC. However, this might be suboptimal. Alternatively, the SCC AS is configured to always break out terminating calls to the CS domain when the call is not terminated over a PS (packet switched) access. In case of network scenarios in which also MSC Server enhanced for ICS (TS 23.292) are deployed, the MSC 1 or 2 can indicate in the registration that this contact shall not be used for termination. This indication is then used by the SCC AS to determine that in case this contact is selected by T-ADS then CS breakout operation shall be used instead of regular IMS termination towards the contact.

When the operator cancels the location for the subscriber, the HLR detects that the subscriber has ICS flag and is registered in MSC3 and ICS capable MSCA/B, so HLR sends a Cancel Location to MSC3 and a new message to MSCA/B in order to deregister from IMS (in one example a DSD MAP operation is sent indicating the IMSI of the UE and a flag of non-ICS-cap-MSC withdrawal).

Figure 10:
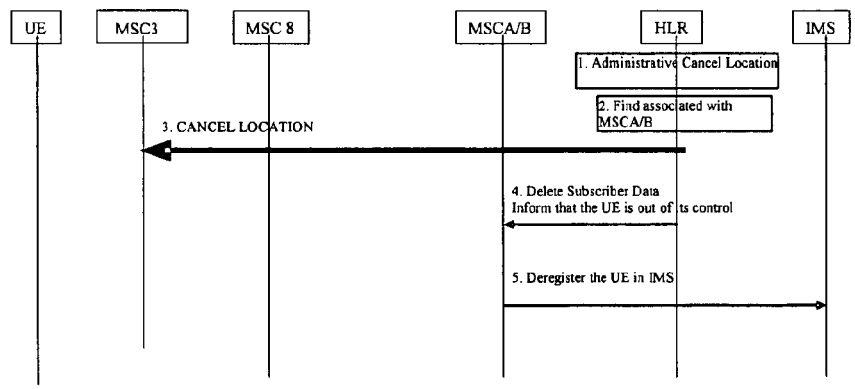
FIG. 10 illustrates a flow chart representing an administrative cancel local update according to a further embodiment of the present invention.

FIG. 10 represents a flow of messages relating to the procedure of administrative cancel local update. In step 1 the HLR determines that an administrative cancel location procedure has to be performed. Consequently, in step 2 the HLR finds the MSC associated with the MSC A/B. In step 3, the HLR sends a cancel location request to the MSC 3 found in step 2. Afterwards or at the same time, the HLR sends in step 4 a message indicating to delete subscriber data and informing that the user equipment UE is out of the control of the given MSC A/B. In step 5, the MSC A/B deregisters the user equipment UE in the IMS.

According to one example, the existing MAP interface could be enhanced according to an example of putting the present invention into practice. For instance, insert subscriber data ISD and delete subscriber data DSD MAP operation can be introduced to carry the ICS information. In order to transport such information, ISD MAP operations could be modified as in the following according to an example (indicated in bold characters) of putting the present invention into practice:

```
Insert Subscriber Data MAPV3
Operation Code=7
Class=1
ASN.1 Formal Description
insertSubscriberData OPERATION ::= {           -- Timer m
ARGUMENT       SEQUENCE    {
      imsi                    [0] IMSI                       OPTIONAL,
      COMPONENTS OF           SubscriberData,
      naea-PreferredCI        [15] NAEA-PreferredCI          OPTIONAL,
      gprsSubscriptionData    [16] GPRSSubscriptionData      OPTIONAL,
      networkAccessMode       [24] NetworkAccessMode         OPTIONAL,
      lmu-Indicator           [21] NULL                      OPTIONAL,
      lcsInformation          [22] LCSInformation            OPTIONAL,
      istAlertTimer           [26] IST-AlertTimerValue       OPTIONAL,
      sgsn-CAMEL-SubscriptionInfo [17] SGSN-CAMEL-SubscriptionInfo
                                                             OPTIONAL,
      chargingCharacteristics [18] ChargingCharacteristics   OPTIONAL,
      accessRestrictionData   [19] AccessRestrictionData     OPTIONAL,
      icsCapableVLR-List      [xx] icsCapableVLR-List        OPTIONAL,
      nonIcsCapableVLR -List       [xyx] ISDN-
AddressStringicsCapableVLR-List    OPTIONAL
}
``` naea-PreferredCI is included at the discretion of the HLR operator.

If the Network Access Mode parameter is sent, it shall be present only in the first sequence if segmentation is used.

```
RESULT        SEQUENCE   {
       teleserviceList       [1] TeleserviceList       OPTIONAL,
       bearerServiceList     [2] BearerServiceList     OPTIONAL,
       ss-List               [3] SS-List               OPTIONAL,
       odb-GeneralData       [4] ODB-GeneralData       OPTIONAL,
       regionalSubscriptionResponse
```

```
                            [5] RegionalSubscriptionResponse   OPTIONAL,
    supportedCamelPhases    [6] SupportedCamelPhases           OPTIONAL,
    extensionContainer      [7] ExtensionContainer             OPTIONAL,
    ...}
        -- optional
ERRORS {
    dataMissing|
    unexpectedDataValue|
    unidentifiedSubscriber
    }
CODE local:7 }
where
icsCapableVLR-List ::= SEQUENCE SIZE (1..maxNumOfICSVLRs) OF
                ISDN-AddressString
maxNumOfICSVLRs INTEGER ::= n
```

It is noted that in the above and below examples expressions like "XX", "XZ" represent placeholders for actual or real information element numbers to be determined according to circumstances or as determined for instance according to an applicable standard.

In the above example, it is noted that maxNumOfICSVLRs value needs to be stated. Minimum value may be 2 due to redundancy but maximum is not specified.

It is also noted that Only ISD MAPV3 is shown in this invention but ISD MAPV1 and MAPV2 should also be upgraded similarly.

In order to transport ICS information, the DSD MAP operation may be realized as in the following by way of example (indicated in bold characters):

According to the previous considerations, Insert Subscriber Data MAP operation may now optionally transport:

Associated ICS-capable MSCs information towards the MSC non-ICS capable where the subscriber is currently located.

Associated non-ICS-capable MSCs information towards the MSC ICS capable where the subscriber is currently located. According to the previous considerations, Delete Subscriber Data MAP operation must now optionally transport:

Associated non-ICS-capable MSCs information towards the MSC ICS capable where the subscriber is currently located.

```
Delete Subscriber Data (HLR-->VLR/SGSN)
Operation Code=8
Class=1
ASN.1 Formal Description
deleteSubscriberData OPERATION ::= {        --Timer m
ARGUMENT    SEQUENCE    {
    imsi                            [0] IMSI,
    basicServiceList                [1] BasicServiceList       OPTIONAL,
    ss-List                         [2] SS-List                OPTIONAL,
    roamingRestrictionDueToUnsupportedFeature
                                    [4] NULL                   OPTIONAL,
    regionalSubscriptionIdentifier  [5] ZoneCode               OPTIONAL,
    camelSubscriptionInfoWithdraw   [9] NULL                   OPTIONAL,
    gprsSubscriptionDataWithdraw    [10] GPRSSubscriptionDataWithdraw
                                                               OPTIONAL,
    gmlc-ListWithdraw               [13] NULL                  OPTIONAL,
    istInformationWithdraw          [14] NULL                  OPTIONAL,
    specificCSI-Withdraw            [15] SpecificCSI-Withdraw
                                                               OPTIONAL,
    nonIcsCapableVLRWithdraw        [xz] NULL                  OPTIONAL
    }
RESULT      SEQUENCE    {
    regionalSubscriptionResponse
                                    [0] RegionalSubscriptionResponse
                                                               OPTIONAL,
    extensionContainer              ExtensionContainer         OPTIONAL,
    ...
    }
        -- optional
ERRORS {
    dataMissing|
    unexpectedDataValue|
    unidentifiedSubscriber
    }
CODE local:8 }
```

The above described behaviour may be summarized for each Use case in the table below:

| Use case | Direction | Message | Recommended attributes |
| --- | --- | --- | --- |
| UE Attach Procedure (e.g. FIG. 5) | HLR->non_ICS_cap_MSC | ISD | IMSI, icsCapableVLR-List, and any other attribute needed in the update location procedure |
| | HLR->ICS_cap_MSC | ISD | IMSI, nonIcsCapableVLR |
| UE moving out of the control of ICS-cap-MSC (e.g. FIG. 9) | HLR->ICS_cap_MSC | DSD | IMSI, nonIcsCapableVLRWithdraw |
| Administrative Cancel Local Update (e.g. FIG. 10) | HLR->ICS_cap_MSC | DSD | IMSI, nonIcsCapableVLRWithdraw |

The above table illustrates attributes carried in the concerned MAP operations for each Use Case according to an example illustrating the functioning of the invention.

According to one example, it is possible to centralize the configuration of the relationship among ICS capable MSCs and non-ICS capable MSCs in HLR only, so the MSCs are not aware of that relation until traffic happens. For instance, a table as follows can be implemented in the HLR:

| MSC Number | Primary ICS cap MSC | Secondary ICS cap MSC |
| --- | --- | --- |
| MSC-1 | MSC-ICS-1 | MSC-ICS-n |
| MSC-2 | MSC-ICS-2 | MSC-ICS-(n − 1) |
| ... | ... | ... |
| MSC-n | MSC-ICS-n | MSC-ICS-1 |
| MSC-(n + 1) | | |
| ... | | |
| MSC-m | | |

The above table shows an example where there are m MSCs totally. Some of them are ICS enhanced (whose number may be bigger than n, but can't be bigger than m), among those MSCs n MSCs (shown as MSC-ICS in the above table) are appointed as serving MSCs for the non-ICS MSCs. The secondary ICS capable MSC is allocated in a reverse order, as an example. When redundancy wants to be achieved, n may be equal or bigger than 2. Even though only MSCA and MSCB are covered along this invention, the number of MSC ICS capable is not restricted to two. This invention is also applicable to the case of having more than two MSC ICS capable in the network.

The above table provides an example of implementing the configuration information. In that case, the configuration information specifies association between non enhanced MSCs and two or more enhanced MSCs. However, as already explained previously, the configuration information may also comprise an association only between a non enhanced MSC and an enhanced MSC. Alternatively, the configuration information may simply indicate to one non enhanced node the address of an associated enhanced node or vice versa. Furthermore, the table is only a way of representing the configuration information: in fact, the same can be implemented by means of other types of data structures (e.g. lists) according to circumstances.

Furthermore, the table can be implemented in an analysis tree algorithm. This table above is statically created by configuration. Alternatively, this table can be dynamically created by means of having a list of non-ICS capable MSCs, a second list with ICS capable MSCs and creating the association between these two types of MSCs upon reception of LU per UE by using, for example, a round robin algorithm. This method will end in a well balanced distribution.

There is a category for an ICS capable subscriber, as for instance specified in appropriate standards like in the TS 23.292.

The process according to a further example of the present invention can be described as follows:

1 When a subscriber updates the location in HLR, the HLR gets the subscriber info and checks the ICS Capable category.

2 If the subscriber is ICS capable, then the MSC number, e.g. MSC3, received in the LU message is analyzed.

3 If the MSC3 is in the table (i.e. found in the configuration information) then it has MSCA/B assigned.

4 HLR gets MSCA/B and MSC3 and stores internally that location information.

5 It sends an Insert Subscriber Data to MSC3 with a new proprietary parameter indicating the MSCA/B address.

6 It sends another new message to MSCA/B indicating IMSI, MSC3 address, status info (reg or dereg) and may be more info.

7 From then on MSCA/B knows about the MSC3 for this subscriber.

8 MSC3 knows about MSCA/B for the subscriber.

9 And the same for HLR who knows and keeps all the relationship.

The present invention achieves several advantages like for instance:

Allowing the ICS deployment with minimum impact on the existing CS network.

Providing a cost efficient and simple to implement ICS solution if the operator chooses to migrate its CS subscribers to ICS over a long period of time.

Providing an HLR based routing method, instead of using CAMEL.

Improved interaction among enhanced and non-enhanced MSCs.

With reference to the advantages over CAMEL based solution the following is in fact noted. Some alternative techniques are known in the state of the art commonly addressed as CS to IMS overlays. They make use of CAMEL/Intelligent network services to perform the interfacing towards IMS. In this technique no enhanced MSCs are needed because the translation is performed by an IN application on the SCP. The IN interface is invoked by OICK or OCSI service indicators in the subscription in the HLR. According to the present invention, to the contrary, an easier and more flexible implementation can be achieved.

In the above description, reference has been made to network entities or component entities (like to communication entity or the storage entity). It is recalled that these entities can be indifferently implemented in one network node or network device or may be implemented in a plurality of network nodes of devices in which the necessary functionalities are distributed in a suitable way.

Moreover, as evident to the reader, the several embodiments and features thereof can be exchanged as necessary. The several examples may be further combined as necessary, as the reader would recognize that any combination thereof (or of parts thereof) is possible without any need to substantial modifications to what has been described.

The invention has been described in relation to particular embodiments and examples which are intended in all aspects to be illustrative rather than restrictive. Those skilled in the art will appreciate that many different combinations of hardware, software and firmware will be suitable for practicing the present invention. Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

Where the terms like communication entity, storage entity or forwarding entity are used herewith, no restriction is made regarding how distributed these elements may be and regarding how gathered elements may be. That is, the constituent parts of a unit or element or entity may be distributed in different software or hardware components or devices for bringing about the intended function. A plurality of distinct elements may also be gathered for providing the intended functionalities.

Any one of the above-referred entity of a network entity, or an element, or a network device, or a network node, etc. . . . may be implemented in hardware, software, field-programmable gate array (FPGA), application-specific integrated circuit (ASICs), firmware or the like.

In further embodiments of the invention, any one of the above-mentioned and/or claimed parts like controller or receiver (this list being not exhaustive) may be replaced by corresponding controlling means or receiving means.

The invention claimed is:

1. A method for handling core network entities of a radio core communications network, the radio core communications network comprising a first network entity and a second network entity, wherein the second network entity differs from the first network entity in that it is capable of processing inter-working between messages exchanged with the radio core communications network and messages exchanged with an IP multimedia subsystem, the method comprising the steps of:
providing at least one amongst the first and second network entities with configuration information, the configuration information indicating a relationship between the first and second core network entities;
routing messages relating to calls established and maintained between a first user terminal attached to the first network entity and a second user terminal attached to the IP multimedia subsystem according to the configuration information.

2. The method of claim 1:
wherein the configuration information comprises first identification information identifying at least the second network entity;
wherein the routing messages is performed at the first core network entity and comprises routing messages originating from the first user terminal to the second core network entity according to the first identification information.

3. The method of claim 2 wherein the first identification information identifies at least a further network entity capable of performing the inter-working.

4. The method of claim 1:
wherein the configuration information comprises second identification information identifying at least the first network entity; and
wherein the routing messages is performed at the second core network entity and comprises routing messages terminating at the first user terminal according to the second identifying information.

5. The method of claim 1 wherein the relationship between the first and second core network entities is that the second network entity is a serving network entity for the first network entity.

6. The method of claim 1 wherein the relationship between the first and second core network entities is that the second network entity is not a serving network entity for the first network entity.

7. The method of claim 1 further comprising updating the configuration information when the first user terminal detaches from the first core network entity and attaches to another core network entity.

8. The method of claim 1 wherein the second network entity registers the second user terminal with the IP multimedia subsystem.

9. An attaching core network entity for a radio core communications network, the attaching core network entity comprising:
a communication entity configured to exchange messages relating to calls associated with, and maintained for, a first user terminal attached to the attaching core network entity through a radio network interface;
a storage entity configured to store configuration information indicating a relationship between the attaching core network entity and one further core network entity, wherein the attaching core network entity differs from the further core network entity in that the further core network entity is adapted to process inter-working between messages exchanged with the radio core communications network and messages exchanged with the IP multimedia subsystem;
wherein the communication entity is further configured to route the messages according to the configuration information.

10. The attaching core network entity according to claim 9:
wherein the configuration information comprises first identification information identifying at least the further network entity;
wherein the communication entity is further configured to route messages originating from the first user terminal to the further core network entity according to the first identification information.

11. The attaching core network entity according to claim 9 wherein the first identification information identifies at least another network entity capable of performing the inter-working.

12. A serving core network entity for a radio core communications network, the serving core network entity comprising:
a processing entity configured to process inter-working between messages exchanged with the radio core communications network and messages exchanged with an IP multimedia subsystem;
a forwarding entity configured to forward messages related to calls associated with, and maintained for, a first user terminal attached to an attaching core network entity, wherein the serving core network entity differs from the attaching core network entity in that the serving core network entity comprises the processing entity;

a storage entity configured to store configuration information indicating a relationship between the serving core network entity and the attaching core network entity;

wherein the forwarding entity is further configured to forward the messages according to the configuration information.

13. The serving core network entity according to claim 12 wherein the messages comprise messages relating to calls associated with the first user terminal.

14. The serving core network entity according to claim 12 wherein the messages comprise at least a registration message for registering the first user terminal with the IP multimedia subsystem on the basis of the configuration information.

15. A serving core network entity of claim 12:
wherein the configuration information comprises identification information identifying at least the one attaching network entity; and
wherein the forwarding entity is configured to route messages terminating at the first user terminal according to the second identifying information.

16. A system for a radio core communications network, the system comprising:
an attaching core network entity;
a serving core network entity;
wherein the attaching core network entity comprises:
a communication entity configured to exchange messages relating to calls associated with, and maintained for, a first user terminal attached to the attaching core network entity through a radio network interface;
a storage entity for configured to store configuration information indicating a relationship between the attaching core network entity and the serving core network entity, wherein the attaching core network entity differs from the serving core network entity in that the serving core network entity is adapted to process inter-working between messages exchanged with the radio core communications network and messages exchanged with the IP multimedia subsystem;
wherein the communication entity is further configured to route the messages according to the configuration information;
wherein the serving core network entity comprises:
a processing entity configured to process inter-working between messages exchanged with the radio core communications network and messages exchanged with an IP multimedia subsystem;
a forwarding entity configured to forward messages associated with the first user terminal;
a storage entity configured to store configuration information indicating a relationship between the serving core network entity and the attaching core network entity;
wherein the forwarding entity is further configured to forward the messages according to the configuration information.

17. The system according to claim 16 further comprising a database storing the configuration information and configured to forward the configuration information to at least one of the attaching core network entity and the serving core network entity.

18. A non-transitory computer readable medium storing a computer program product for handling core network entities of a radio core communications network, the radio core communications network comprising a first network entity and a second network entity, wherein the second network entity differs from the first network entity in that it is capable of processing inter-working between messages exchanged with the radio core communications network and messages exchanged with an IP multimedia subsystem, the computer program product comprising software instructions which, when run on a programmable system, causes the programmable system to:
provide at least one amongst the first and second core network entities with configuration information, the configuration information indicating a relationship between the first and second core network entities;
route messages relating to calls established and maintained between a first user terminal attached to the first core network entity and a second user terminal attached to the IP multimedia subsystem according to the configuration information.

* * * * *

UNITED STATES PATENT AND TRADEMARK OFFICE
CERTIFICATE OF CORRECTION

PATENT NO. : 8,811,229 B2  
APPLICATION NO. : 13/577474  
DATED : August 19, 2014  
INVENTOR(S) : Wang et al.

Page 1 of 1

It is certified that error appears in the above-identified patent and that said Letters Patent is hereby corrected as shown below:

In the Drawings

In Fig. 1, Sheet 1 of 5, delete "Fig. 1" and insert -- Figure 1 --, therefor.

In Fig. 2, Sheet 1 of 5, delete "Fig. 2" and insert -- Figure 2 --, therefor.

In Fig. 3, Sheet 2 of 5, delete "Fig. 3" and insert -- Figure 3 --, therefor.

In Fig. 4, Sheet 2 of 5, delete "Fig. 4" and insert -- Figure 4 --, therefor.

In the Specification

In Column 15, Line 32, delete "DE" and insert -- UE --, therefor.

In Column 21, Line 57, delete "vide versa." and insert -- vice versa. --, therefor.

Signed and Sealed this  
Eighteenth Day of August, 2015

Michelle K. Lee  
*Director of the United States Patent and Trademark Office*